United States Patent Office 3,236,614
Patented Feb. 22, 1966

3,236,614
DISTILLATE FUEL COMPOSITIONS CONTAINING ETHER AMINE SALTS OF ORGANIC PHOSPHATES
David W. Young, Homewood, Ill., and Tai S. Chao, Bloomington, and Jack W. Sigan, Minneapolis, Minn.; said Young assignor to Sinclair Refining Company, New York, N.Y., a corporation of Maine
No Drawing. Filed Dec. 17, 1959, Ser. No. 860,087
15 Claims. (Cl. 44—72)

This invention relates to novel ether amine salts of an organic phosphate and normally liquid hydrocarbon distillate fuel compositions, e.g., gasoline, including these salts as ice inhibiting components to improve the operation of internal combustion engines under cool, humid atmospheric conditions.

These salts correspond to compounds of the following formula:

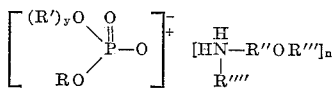

wherein R is a normal or branched chain alkyl radical generally containing from about 4 to 12 carbon atoms and preferably is branched containing from about 6 to 12 carbon atoms, for instance, isoheptyl, isooctyl oxo (from oxo alcohol prepared by the "Oxo" process) and isononyl; R' is R (R and R' may be the same or different alkyl groups) or H; $y$ is 2 minus $n$; R'' is an akylene, including oxyalkylene, radical generally containing from about 1 to 12 carbon atoms, preferably a normal alkylene radical containing from about 1 to 6 carbon atoms, for instance, n-ethylene, n-propylene, and n-butylene radicals; O in the nitrogen-containing radical is an ether oxygen; R''' is a normal or branched chain alkyl radical containing generally from about 5 to 18 carbon atoms, preferably branched chain and containing from about 6 to 10 carbon atoms, for instance, 2-ethylhexyl, isoheptyl, and isononyl; R'''' is —R''OR''' or H; and $n$ is a number from 1 to 2. We prefer mixtures of compounds of the formula:

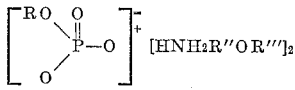

and

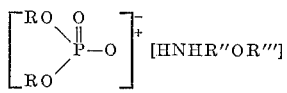

wherein R, R'' and R''' have the same representations as noted above and wherein at least about 10% of each component is present in the mixture.

The novel ether amine salts of an organic phosphate can be prepared by neutralization of an ester of the particular phosphoric acid with approximately stoichiometric proportions of an ether amine of the class described herein. In most instances, it is advantageous that the pH of the reaction mixture be adjusted to substantially neutral, i.e., between about 5.5 and about 7.5, by controlling the amount of ether amine introduced into the reaction. In the case of ether amines that are very weak bases, however, a lower pH, for example of the order of 3.0 or 3.5 is satisfactory. The neutralization reaction normally takes place spontaneously, or substantially so, with the evolution of heat. It is preferable to maintain the reaction temperature below about 180° F., cooling the reaction mixture if necessary.

The ether amines employed in the preparation of the salts can be conveniently prepared through the cyanoalkylation of alcohols followed by the hydrogenation of the resulting ether nitriles. The reactions involved can be illustrated by the following:

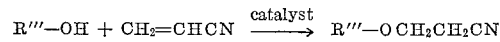

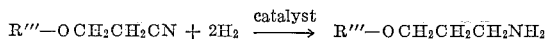

Secondary ether amines (those in which R'''' is —R''—O—R''') can be prepared from the primary ether amines by disproportionation, as represented by the following equation:

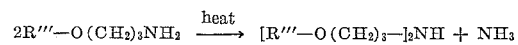

The novel ether amine salt compounds of the present invention can be salts of mono- and diesters of o-phosphoric acid. They can contain other than hydrocarbon substituents. Although salts of ether amines containing hydrocarbon substituents are preferred as anti-stalling agents, salts of ether amines whose substituents contain other elements which do not adversely affect the combustion characteristics of the ultimate gasoline compositions can be used. Among the useful specific ether amine salts of the organic phosphates are the amine salts of 3(2-ethylhexoxy) n-propylamine, iso-amyloxy-n-propylamine, mixed iso- and normal amyloxy-n-propylamine, n-hexoxy-n-propylamine, and iso-octoxy-n-propylamine; and di-n-butyl, amyl, di-n-amyl, isoamyl, di-isoamyl, isoamyl iso-octyl, di-n-octyl, isooctyl oxo, di-isooctyl oxo, di-n-octyl, and n-decyl o-phosphates. The "oxo" octyl alcohols are highly branched chain saturated aliphatic monohydric alcohols, e.g., octyl alcohols, prepared by the "Oxo" process. Briefly, this process involves the hydroformylation of olefinic hydrocarbons, followed by hydrogenation of the carboxylic compounds thus obtained. Normally, the olefinic hydrocarbons used in the manufacture of oxo-octyl alcohols are prepared by condensation of $C_3$ and $C_4$ olefins in the usual proportion in which they occur in refinery process gases. Oxo-octyl alcohols will normally contain a mixture of branched chain isomers of octyl alcohol, and the mixture will consist mostly of isomeric dimethylhexanols. The nature and proportions of the isomeric mixed alcohols, however, can be varied to some extent by varying the proportions of the $C_3$ and $C_4$ olefins used in preparing the $C_7$ olefin to be hydroformylated.

The ether amine salts of this invention can be utilized in gasoline fuels, i.e., hydrocarbon mixtures boiling in the gasoline range, in concentrations that are sufficient to reduce the engine stalling tendencies of the gasoline fuels. The novel compounds are particularly desirable for use in this connection since they are economically advantageous on a cost basis, exhibit advantageous anti-stalling characteristics when employed in minimal amounts and rust inhibiting characteristics. The preferred compounds also provide advantageous water-tolerance characteristics. The novel ether amine salts are generally employed in gasoline in concentrations of from about 0.0001 to 0.05 or more percent and preferably from about .004 to .01 percent. The upper limit on the ether amine salts seems to be essentially a matter of economics. The salts can be added to the gasoline as a solution in light hydrocarbons such as kerosene or in lubricating oil.

With respect to the particular concentration ranges mentioned above, it will be appreciated that the optimum concentration of the anti-stalling combination can vary according to the specific ether amine salts used and according to the severity of the atmospheric conditions. With regard to the last mentioned factor, the problem of engine stalling due to carburetor icing resulting from the refrigeration of moisture condensed from the atmosphere by evaporating gasoline has been observed to be significant at atmospheric temperatures of between about 30° and 60° F., e.g., 35°, 40°, 45°, 50° F., and when the relative humidity is in excess of about 65 percent, e.g., 75, 85, 95, 99 percent. The optimum concentration of anti-stalling additive should be sufficient to effect a substantial reduction in the stalling tendencies of the fuel at the atmospheric conditions of temperature and humidity which are likely to be encountered in service.

The problem of engine stalling due to carburetor icing during rapid evaporation of gasoline occurs primarily in connection with gasolines having a relatively low 50 percent ASTM distillation point of not greater than about 275° F. While occasional engine stalling may occur as a result of carburetor icing at severe atmospheric conditions of temperature and humidity with gasolines, having somewhat higher 50 percent ASTM distillation points, experience has indicated that the problem does not normally assume such significant magnitude. Preferably, the gasoline includes liquid hydrocarbon mixtures having a 90 percent ASTM distillation point of not more than about 395° F. and a 10 percent ASTM distillation point of not more than about 140.

The anti-stalling additives included in the composition of this invention can be incorporated into gasoline compositions in any convenient manner. If desired, the ether amine salts can be added in the form of concentrated solutions or dispersions in solvents such as mineral oil, gasoline, naphtha, Stoddard solvent, mineral spirits, benzene, heptane, kerosene or the like. If desired, the anti-stalling agent can be incorporated in gasoline fuel compositions in admixture with other gasoline improvement agents, such as antioxidants, anti-knock agents, ignition control additives, dehazing agents, anti-rust additives, dyes and the like.

Although the ether amine salts of this invention are utilized as anti-stalling agents, as noted above they are additionally useful in that they impart valuable anti-rust properties to gasoline compositions when used in anti-stalling concentrations.

The novel compounds and compositions of this invention and their preparation are illustrated by the following specific examples.

Example I 350 grams of isooctyl oxo phosphate (a commercially available mixture of mono-, and di-isooctyl oxo phosphates wherein the isooctyl oxo radicals are mostly isomeric dimethylhexyl radicals) were placed in a 1 liter 3-neck flask equipped with a stainless steel stirrer, a reflux condenser and a nitrogen gas inlet. With constant stirring and cooling with a water bath, 342 grams of crude 3-(2-ethylhexoxy)n-propylamine were added from a dropping funnel during the course of 15 minutes. A maximum temperature of about 60° C. was observed. The product was a light orange colored liquid having a pH of 7.2. It showed the following analysis: 6.14% phosphorus and 3.52% nitrogen. A similar run with distilled 3-(2-ethylhexyloxy)n-propylamine gave a colorless product having an equivalent analysis. This product is an ether amine salt of isooctyl phosphate and more specifically 3-(2-ethylhexoxy)-n-propylamine i-octyl phosphate and essentially a mixture of the ether amine salts of mono and di alkyl phosphates.

Example II 350 grams of mono and di-alkyl phosphates prepared from a mixture of n-$C_8$ and including $C_{12}$ fatty alcohols were placed in a 1 liter, 3-necked flask equipped with a stainless steel stirrer, a reflux condenser and a nitrogen gas inlet. With constant stirring and cooling with a water bath, 280 grams of 3-(2-ethylhexyloxy)n-propylamine were added from a dropping funnel during the course of 15 minutes. A maximum temperature of 61° C. was observed. The product was a viscous liquid soluble in kerosene and gasoline in all proportions. It showed a pH of 7.2 and a light yellow color. It analyzed 5.62% phosphorus and 3.20% nitrogen, 6.14% phosphorus and 3.52% nitrogen.

To illustrate that secondary as well as primary ether amines are useful in the preparation of gasoline corrosion inhibitors, the bis-3(2-ethylhexoxypropyl) amine salt of iso-octyl phosphates was prepared as follows:

Fifteen grams of bis-3(2-ethylhexoxypropyl) amine, isolated as a by-product in the preparation of 2-ethylhexoxypropyl amine, was neutralized with 10.9 g. of iso-octyl phosphate. The product was an orange-red colored viscous oil, soluble in kerosene, gasoline and other hydrocarbon solvents.

Example III

Table I shows a series of ether amine salts of iso-octyl phosphate prepared and the essential conditions of preparation. In each of these 40 g. of a 70% solution of iso-octyl phosphate in mineral spirits was placed in a tarred container and a calculated amount of ether amine was added. The calculation was based on the following equation and our previous finding that roughly 70% of the amine equivalent to the second acid value (thymolphthalein end point) of the phosphate was sufficient to bring the pH of the salt to 6.9–7.1.

$$W_A = \frac{0.7 W_P \ (A.V.) \ M}{56108}$$

where $W_A$ = grams of ether amine required,
$W_P$ = grams of mono-di-alkyl phosphate used,
A.V. = acid value of the phosphate, in number of milligrams of potassium hydroxide required to neutralize one gram of the phosphate to thymolphthalein end point, and
$M$ = molecular weight of the ether amine.

In the present example $W_P$ is 40, A.V. is 225 and, hence, $W_A$ is equal to 0.112M. Since the actual amount of ether amine required depends both on the quality of the amine and the exact shape of the neutralization curve of individual compound, slightly less than this amount, namely 0.10M of the individual ether amine, was used at first. The phosphate and the amine were stirred until a homogeneous product was obtained. The pH of this product was measured and additional amounts of ether amine were added until a pH of 6.9–7.1 was attained.

TABLE I.—PREPARATION OF ETHER AMINE SALTS OF ISO-OCTYL PHOSPHATES

| Name | Formula | M | $W_A$, start | Grams final | Final pH | Appearance |
|---|---|---|---|---|---|---|
| i-Propyl-n-propyl ether amine | i-$C_3H_7OC_3H_6NH_2$ | 117 | 11.7 | 11.9 | 6.9 | Pale yellow clear liquid. |
| n-Butyl-n-propyl ether amine | n-$C_4H_9OC_3H_6NH_2$ | 131 | 13.1 | 13.7 | 6.9 | Do. |
| i-Butyl-n-propyl ether amine | i-$C_4H_9OC_3H_6NH_2$ | 131 | 13.1 | 13.7 | 6.9 | Do. |
| Mixed amyl-n-propyl ether amine | $C_5H_{11}OC_3H_6NH_2$ | 145 | 14.5 | 16.0 | 7.0 | Do. |
| n-Hexyl-n-propyl ether amine | n-$C_6H_{13}OC_3H_6NH_2$ | 159 | 15.9 | 18.3 | 6.9 | Do. |
| i-Octyl-n-propyl ether amine | i-$C_8H_{17}OC_3H_6NH_2$ | 187 | 18.7 | 19.6 | 6.95 | Do. |
| Oxo decyl-n-propyl ether amine | i-$C_{10}H_{21}OC_3H_6NH_2$ | 215 | 21.5 | 22.8 | 7.0 | Do. |
| Butyl-Cellosolve ether amine | n-$C_4H_9OC_2H_4OC_3H_6NH_2$ | 175 | 17.5 | 18.7 | 7.0 | Do. |
| Butyl-Carbitol ether amine | n-$C_4H_9O\ (C_2H_4O)_2C_3H_6NH_2$ | 219 | 21.9 | 24.1 | 7.0 | Do. |

Each of the other amine salts of iso-octyl phosphates set forth in Table I is incorporated into a gasoline fuel, blend No. 1 described in Table II below, in an amount of 4 pounds per 1000 barrels of gasoline.

*Example IV*

The compound of Example I was blended with kerosene to an 80 percent additive concentrate and incorporated into a gasoline fuel, blend No. 1 described in Table II below, in an amount of 4 pounds per 1000 barrels of gasoline, to provide a gasoline composition with advantageous anti-stalling, water tolerance, and rust inhibition characteristics.

The anti-stalling, rust inhibition, and water tolerance characteristics of a number of amine salts of mono and dialkyl phosphates were determined. Surprisingly, however, the compositions of the present invention provided gasoline with the desirable anti-stalling or ice inhibition and rust inhibition characteristics. The preferred compounds also exhibited advantageous water tolerance characteristics.

CHARACTERISTICS OF THE COMPOUND
(COMPOUND A) OF EXAMPLE I (A) *Solubility in hydrocarbons.*—It was dissolved in kerosene at 10, 25, 50 and 75% concentrations and was miscible in every instance.

(B) *Activity in various products.*—Turbine rust tests were run to determine minimum inhibitor requirements. The results follow:

Pounds of inhibitor/1,000 bbls. needed for "B++" or "A" ratings: [1]
  Gasoline _____ 1.3
  Diesel fuel _____ 1.0
  Kerosene _____ 1.2

[1] ¼% or less of test area rusted.

(C) *Storage stability.*—Borderline inhibited blends of gasoline and Composition A (1.3 lb./1000 bbls.) have been stored for a month and at intervals of one, two, seven, fourteen, and thirty days, and the samples were withdrawn for rust tests. In all cases B++ or A ratings were obtained. The test samples were carefully decanted. This indicates that there is no tendency for the inhibitor to drop out of solution during storage.

(D) *Film permanence.*—Tests were run wherein inhibitor films of Composition A were deposited on turbine test rods from gasoline. It was exposed in kerosene and gasoline with no inhibitor present. Those in kerosene rusted nearly 100% in 24 hours indicating very little film permanence. However, those in gasoline showed a measure of residual corrosion protection. After a continuous exposure for 72 hours, less than half of the test area exposed was rusted. This will be an advantage when an occasional cargo which does not contain an inhibitor is shipped.

(E) *Effect of Compound A on other properties of products.*—The following table lists pertinent tests showing the effect of Compound A on the physical properties of fuel blend No. 1 described in Table II below:

| Additive | | [1] A |
|---|---|---|
| Conc. lb./Mbbl. (active ingredient) | | 4 |
| Inspection tests: | | |
| ASTM gum, mg./100 ml | 0.6 | 6.6 |
| ASTM gum, after C₇ wash | 0.3 | 0.4 |
| 4 hr. accel. gum, mg./100 ml | 2.2 | 5.7 |
| 4 hr. accel. gum, after C₇ wash | 1.3 | 1.9 |
| Copper strip corr. at 122° F | 1A | 1A |
| O₂ bomb stability, min | 1,130 | 1,210 |
| Rust test | E | A |
| Storage stability, 10 days at— | | |
| 78° F | OK | OK |
| 10° F | OK | OK |

[1] A 50/50 blend of two batches of Compound A.

As noted supra, Compound A has been tested for its effectiveness in alleviating carburetor icing. A full range gasoline having a nominal 50% point of 200° F. was employed as the principal base fuel. Concentrations varying from 0.0005% to 0.01% of Compound A in the base fuel were tested. The data clearly indicate the advantageous results provided by Compound A (made up in equal portions from each of two batches) which was employed as a 20% concentrate in kerosene.

The equipment for obtaining these data consisted of a source of cool humid air and a multicylinder engine with an isolated carburetor. The cool air was provided by bubbling air through a cold water bath. The water was cooled by a refrigeration coil immersed in the water bath. The temperature of the air was controlled by controlling the water bath temperature. The relative humidity was controlled within limits by adjusting the level of the water bath. A 1953 Chevrolet 6-cylinder engine equipped with a Carter Model YF carburetor was used in the test program. The engine was not operated with a load at any time.

The physical inspections for the fuels used in the evaluation are given in Table II. A limited amount of data was obtained with the heavier fuel for the purpose of determining whether differences in fuels could alter the effectiveness of the additive tested.

Procedure "B" employed for these tests includes warming up the engine at 1500 r.p.m. until all operating temperatures are normal. The carburetor is then cooled by admitting cool air to the intake for a period of 5 or 6 minutes. At the end of this time the cool air is taken off and the carburetor warmed up for 4 minutes while the fuel to be tested is flushed through the carburetor. At this time the carburetor is washed with a solution of 90% methyl alcohol and 10% water to remove ice and any residual effect of additives. The cool air is then re-admitted to the carburetor intake for a period of time usually chosen by estimation. At the end of this period the engine is idled for 30 seconds. If the engine stalls, the cool running time is shortened by 30 seconds and the run repeated after a 4 minute warm-up. This is repeated at successively shorter cool running times until the engine will idle for 30 seconds without stalling. By this manner two cool running times are determined, 30 seconds apart, one of which will cause the engine to stall when idled, the other does not. Interpolation between these two times was done according to the length of time the engine would run at idle before stalling, on the longer length run. If the engine does not stall during the 30 second idle period following the estimated running period first performed on the fuel, the above procedure is reversed, i.e., the running time is increased by 30 seconds until some time is found where stalling will occur during the idle period. There is always a 4-minute, 1500 r.p.m., warm-up period after each idle period.

Results obtained by this procedure were averaged and summary results are tabulated in Table III. Table IV below shows the results obtained with two concentrations of Compound A with both fuel blends No. 1 and No. 2. The former had a 50% point of 200° F. while the latter a 50% point of 221° F.

TABLE IV

| Additive | Percent | Avg. time to stall, min. | |
|---|---|---|---|
| | | Base fuel No. 1 | Base fuel No. 2 |
| A | 0.002 | 1.8 | 1.9 |
| A | 0.004 | 2.1 | 2.0 |

A comparison of the data obtained with the two fuel blends indicates no significant difference in the average time to stall.

TABLE II.—FUEL INSPECTIONS

|  | Blend No. 1 | Blend No. 2 |
|---|---|---|
| °API | 61.2 | 58.2 |
| IBP, 1° F | 84 | 87 |
| 5% | 106 | 108 |
| 10% | 116 | 120 |
| 20% | 135 | 143 |
| 30% | 156 | 167 |
| 40% | 178 | 194 |
| 50% | 200 | 221 |
| 60% | 226 | 246 |
| 70% | 252 | 271 |
| 80% | 280 | 294 |
| 90% | 312 | 318 |
| 95% | 342 | 359 |
| E.P. | 380 | 385 |
| Recovery | 97.0 | 97.0 |
| Residue | 1.1 | 1.0 |
| Loss | 1.9 | 2.0 |
| RVP | 10.7 | 10.6 |
| RM octane | 102.1 | 103.3 |

TABLE III.—CHEVROLET CARBURETOR ICING TESTS—SUMMARY RESULTS—"B" PROCEDURE

[Fuel: Base Fuel No. 1]

| Percent conc. of Compound A: | Avg. time to stall, min. |
|---|---|
| 0.0005 | 1.2 |
| 0.001 | 1.7 |
| 0.0015 | 1.5 |
| 0.002 | 1.8 |
| 0.003 | 1.9 |
| 0.004 | 2.1 |
| 0.006 | 2.4 |
| 0.010 | 3.1 |

Compound A was evaluated by the Briggs and Stratton, single cylinder, four cycle engine anti-icing screening test. The following table gives the test data obtained.

DELAY IN FROST TIME—SECONDS [1]

| Additive, vol. percent: | Compound A, percent Phos. 5.07 |
|---|---|
| 0.005 | +13 |
| 0.0075 | — |
| 0.010 | +31 |
| 0.020 | +58 |
| 0.030 | — |

[1] Difference in time to frost for the base fuel and base fuel plus additive.

The ether amine prepared from a mixture of n–C$_8$ and including C$_{12}$ fatty alcohols in Example II (Compound B) was compared with the ether amine of Example I (Compound A) which was prepared from a phosphate with a branched chain alkyl radical. Each of A and B were blended to an 80 percent concentrate using kerosene. These comparison tests show that (a) 0.0075 percent of A and 0.007 percent of B exhibited comparable deicing characteristics in gasoline;

(b) 1.3 pounds of A per 1000 barrels of gasoline provided a rating of "B++" in Modified D 665 Turbine Rust Test procedure and 1.2 pounds of B per 1000 barrels of gasoline provided a rating of "A." In this procedure, a rating of "B++" is given when there is less than one quarter percent rust; and (c) In water tolerance tests using MIL-I-25017 test equipment wherein a rating of 1B is the minimum for passing and requires the absence of any film at the surface interface, A passed with a rating of "1" and B failed with a rating of "4."

Thus, the above comparisons show the advantage (water tolerance) of a branched chain for the alkyl radical of the phosphate over the straight chain.

Although the ether amine additives of the present invention have been incorporated in gasoline to demonstrate the anti-stalling characteristics provided by this additive in hydrocarbon distillate fuel compositions, the additive is also useful for this purpose in fuel compositions other than gasoline. For instance, they can be employed in non-viscous liquid hydrocarbon base fuels which are heavier than gasoline and include, for example, kerosenes, diesel fuels, domestic fuel oils, jet engine fuels such as JP-3, JP-4 and JP-5 specification fuels, and other broad or narrow petroleum-derived fractions of similar boiling range. In general, these base fuels have essentially an ASTM distillation range above about 175° F., for instance, between about 200 to 700° F. with the 90% point being at least about 450° F. Certain of these fuels distill in the range of about 400 to 650° F., and the more desirable of the fuels have API gravities of about 35 to 50. The novel ether amine salts are generally employed in the non-viscous liquid hydrocarbon base fuels, for instance, jet fuels, in concentrations up to about 0.1 weight percent or more.

To illustrate the use of this additive in jet fuels, a jet fuel oil composition is prepared by blending 100 lbs. of a JP-4 petroleum derived specification fuel (ASTM distillation range of 220-500° F.) jet fuel and an amount of the ether amine additive of Example I (Compound A) to provide a concentration of 0.009 weight percent based on the jet fuel. This composition has exhibited materially improved anti-stalling characteristics when compared with a jet fuel having none of the additive.

It is claimed:

1. A normally liquid hydrocarbon distillate fuel composition having incorporated therein an anti-stalling amount of an ether amine salt corresponding to the formula:

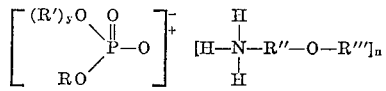

wherein R is an alkyl radical containing from about 4-12 carbon atoms, R' is selected from the group consisting of R and H, $y$ is 2 minus $n$, R" is an alkylene radical containing from about 1-12 carbon atoms, O in the nitrogen containing radical is an ether oxygen, R'" is an alkyl radical containing from about 4-18 carbon atoms, and $n$ is a number from 1 to 2.

2. The fuel composition of claim 1 wherein the fuel is gasoline and the anti-stalling amount is from about 0.0001 to 0.01 percent.

3. The composition of claim 2 wherein R is a branched chain alkyl radical.

4. The composition of claim 2 wherein the composition contains a mixture of ether amine salts of mono- and di-alkyl phosphates corresponding to the formula.

5. The composition of claim 4 wherein the mixture is of the ether amine salts of mono- and di-isooctyl oxo phosphates.

6. The composition of claim 5 wherein the ether amine salts are salts of 3-(2-ethylhexoxy)n-propylamine.

7. The composition of claim 6 wherein the propylamine is a primary amine.

8. The composition of claim 6 wherein the propylamine is a secondary amine.

9. The composition of claim 2 wherein the ether amine salt is the i-propyl-n-propyl ether amine salt of iso-octyl phosphate.

10. The composition of claim 2 wherein the ether amine salt is the n-butyl-n-propyl ether amine salt of iso-octyl phosphate.

11. The composition of claim 2 wherein the ether amine salt is the i-butyl-n-propyl ether amine salt of iso-octyl phosphate.

12. The composition of claim 2 wherein the ether amine salt is the mixed amyl-n-propyl ether amine salt of iso-octyl phosphate.

13. The composition of claim 2 wherein the ether amine salt is the n-hexyl-n-propyl ether amine salt of iso-octyl phosphate.

14. The composition of claim 2 wherein the ether amine salt is the mixed i-octyl-n-propyl ether amine salt of iso-octyl phosphate.

15. The composition of claim 2 wherein the ether amine salt is the oxo decyl-n-propyl ether amine salt of iso-octyl phosphate.

References Cited by the Examiner

UNITED STATES PATENTS

| | | | |
|---|---|---|---|
| 2,372,624 | 3/1945 | Carpenter | 260—584 |
| 2,409,675 | 10/1946 | Gresham | 260—584 |
| 2,516,913 | 8/1950 | Revukas | 260—461 |
| 2,656,372 | 10/1953 | Ernst et al. | 260—461 |
| 2,851,343 | 9/1958 | Cantrell et al. | 44—56 |
| 2,863,742 | 12/1958 | Cantrell et al. | 44—72 |
| 2,863,904 | 12/1958 | Cantrell et al. | 44—56 |
| 2,904,416 | 9/1959 | Clark et al. | 44—72 |
| 2,905,542 | 9/1959 | Gottsholl et al. | 44—72 |
| 2,911,431 | 11/1959 | Orloff et al. | 44—56 |
| 2,959,473 | 11/1960 | Andress | 44—56 |
| 3,063,819 | 11/1962 | Watt et al. | 44—56 |

FOREIGN PATENTS

| | | |
|---|---|---|
| 791,394 | 3/1958 | Great Britain. |
| 791,397 | 3/1958 | Great Britain. |

DANIEL E. WYMAN, *Primary Examiner.*

JULIUS GREENWALD, *Examiner.*